United States Patent
Pong et al.

(10) Patent No.: US 11,597,089 B2
(45) Date of Patent: Mar. 7, 2023

(54) METHOD, SYSTEM, AND NON-TRANSITORY COMPUTER-READABLE RECORDING MEDIUM FOR CONTROLLING A DESTINATION OF A ROBOT

(71) Applicant: Bear Robotics, Inc., Redwood City, CA (US)

(72) Inventors: Bryant Leo Pong, Hayward, CA (US); Fangwei Li, Belmont, CA (US); Henry A. Leinhos, Palo Alto, CA (US)

(73) Assignee: Bear Robotics, Inc., Redwood City, CA (US)

( * ) Notice: Subject to any disclaimer, the term of this patent is extended or adjusted under 35 U.S.C. 154(b) by 130 days.

(21) Appl. No.: 17/091,574

(22) Filed: Nov. 6, 2020

(65) Prior Publication Data

US 2022/0143832 A1    May 12, 2022

(51) Int. Cl.
*G05D 1/02* (2020.01)
*B25J 9/16* (2006.01)

(52) U.S. Cl.
CPC ........... *B25J 9/1666* (2013.01); *B25J 9/1676* (2013.01); *G05D 1/0214* (2013.01); *G05D 1/0217* (2013.01); *G05D 1/0274* (2013.01)

(58) Field of Classification Search
CPC ..... B25J 9/1666; B25J 9/1676; G05D 1/0214; G05D 1/0217; G05D 1/0274; G05D 1/0246; G05D 2201/0211
See application file for complete search history.

(56) References Cited

U.S. PATENT DOCUMENTS

| | | | |
|---|---|---|---|
| 7,474,945 B2 * | 1/2009 | Matsunaga | G05D 1/0217 701/25 |
| 2011/0137461 A1 * | 6/2011 | Kong | G05D 1/0274 901/1 |
| 2013/0166134 A1 | 6/2013 | Shitamoto et al. | |
| 2016/0132056 A1 | 5/2016 | Yoshino | |
| 2018/0217598 A1 * | 8/2018 | Kuhara | G06Q 10/08 |
| 2019/0025838 A1 | 1/2019 | Artes et al. | |
| 2019/0155296 A1 * | 5/2019 | Moore | H02J 7/0045 |
| 2021/0041887 A1 * | 2/2021 | Whitman | G05D 1/0253 |
| 2021/0064019 A1 * | 3/2021 | Choi | G05D 1/0246 |
| 2021/0331315 A1 * | 10/2021 | Park | B25J 9/1676 |
| 2022/0121837 A1 * | 4/2022 | Cesic | G06K 9/6217 |

FOREIGN PATENT DOCUMENTS

| | | |
|---|---|---|
| JP | 2018124676 A | 8/2018 |
| JP | 2020149665 A | 9/2020 |
| KR | 200256086 Y1 | 12/2001 |
| WO | 2020167613 A1 | 8/2020 |

* cited by examiner

*Primary Examiner* — Nicholas Kiswanto
*Assistant Examiner* — Danielle Marie Jackson
(74) *Attorney, Agent, or Firm* — Dinsmore & Shohl LLP; Yongsok Choi, Esq.

(57) ABSTRACT

There is provided a method for controlling a destination of a robot. The method includes the steps of: when information on obstruction of arrival at a first destination of a robot is acquired, determining an obstruction area associated with the arrival obstruction information by clustering adjacent areas around the first destination, determining a destination candidate area around the obstruction area with reference to a size of the robot, and determining an area in the destination candidate area, which is specified on the basis of a location of the robot, as a second destination of the robot.

13 Claims, 7 Drawing Sheets a) Normal case b) Case where the destination cannot be reached

300

METHOD, SYSTEM, AND NON-TRANSITORY COMPUTER-READABLE RECORDING MEDIUM FOR CONTROLLING A DESTINATION OF A ROBOT

FIELD OF THE INVENTION

The present invention relates to a method, system, and non-transitory computer-readable recording medium for controlling a destination of a robot.

BACKGROUND

Robots are utilized to replace or assist people in various fields because they can automatically perform difficult tasks or repetitive operations. Recently, various researches are being conducted on techniques for assisting a robot to smoothly move to a desired destination.

As an example of related conventional techniques, Korean Laid-Open Patent Publication No. 10-2016-0150380 discloses a system for guiding a robot disposed on a pad to a destination using infrared light, comprising: a pad in which a plurality of optical modules each including a light emission unit for emitting infrared light and a light reception unit for receiving infrared light are arranged; and a robot disposed on the pad and configured to move to a destination, wherein the pad operates the plurality of optical modules to detect whether infrared light is reflected by the robot and determine a location corresponding to the optical module in which the reflection of infrared light is detected among the plurality of optical modules as a current location of the robot, and then transmits information on the determined current location of the robot and the location of the destination to the robot.

However, the techniques introduced so far as well as the above-described conventional technique have been only interested in how to accurately and efficiently move a robot to a specified destination, and have not specifically addressed how the robot should move in a state in which it is impossible to arrive at the destination (e.g., the robot cannot reach the destination due to an obstacle). In a state in which a destination cannot be reached as above, a robot mostly interrupts its movement and route finding and informs a user of such a state. However, when the robot stops its movement in commercial facilities such as restaurants and markets, there are problems in that a safety-related accident may be caused and views of the facilities may be spoiled.

In this connection, the inventor(s) present a novel and inventive technique for finding an alternative destination when information on obstruction of arrival at a preset destination of a robot is acquired, and assisting the robot to move to the alternative destination.

SUMMARY OF THE INVENTION

One object of the present invention is to solve all the above-described problems in the prior art.

Another object of the invention is to assist a robot to efficiently find and move to an alternative destination without stopping its operation even if the robot is unable to reach a preset destination.

Yet another object of the invention is to assist stable control of a robot by dynamically setting an alternative destination suitable for a given situation.

Still another object of the invention is to efficiently and quickly find an alternative destination without excessive computational load.

The representative configurations of the invention to achieve the above objects are described below.

According to one aspect of the invention, there is provided a method for controlling a destination of a robot, the method comprising the steps of: when information on obstruction of arrival at a first destination of a robot is acquired, determining an obstruction area associated with the arrival obstruction information by clustering adjacent areas around the first destination; determining a destination candidate area around the obstruction area with reference to a size of the robot; and determining an area in the destination candidate area, which is specified on the basis of a location of the robot, as a second destination of the robot.

According to another aspect of the invention, there is provided a system for controlling a destination of a robot, the system comprising: an obstruction area determination unit configured to, when information on obstruction of arrival at a first destination of a robot is acquired, determine an obstruction area associated with the arrival obstruction information by clustering adjacent areas around the first destination; a destination candidate area determination unit configured to determine a destination candidate area around the obstruction area with reference to a size of the robot; and a destination determination unit configured to determine an area in the destination candidate area, which is specified on the basis of a location of the robot, as a second destination of the robot.

In addition, there are further provided other methods and systems to implement the invention, as well as non-transitory computer-readable recording media having stored thereon computer programs for executing the methods.

According to the invention, it is possible to assist a robot to efficiently find and move to an alternative destination without stopping its operation even if the robot is unable to reach a preset destination.

According to the invention, it is possible to assist stable control of a robot by dynamically setting an alternative destination suitable for a given situation.

According to the invention, it is possible to efficiently and quickly find an alternative destination without excessive computational load.

DETAILED DESCRIPTION OF THE INVENTION

Figure 1:
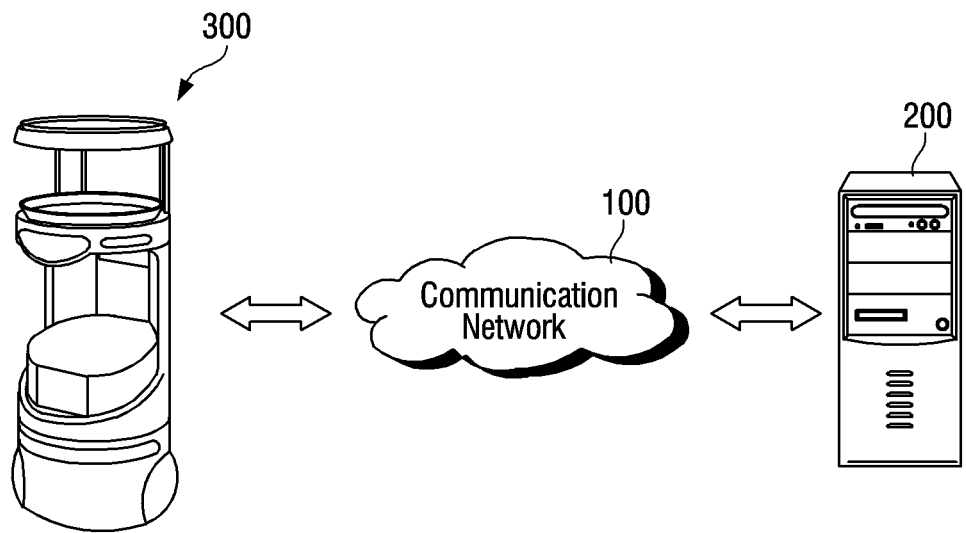
FIG. 1 schematically shows the configuration of an entire system for controlling a destination of a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a destination of a robot according to one embodiment of the invention.

As shown in FIG. 1, the entire system according to one embodiment of the invention may comprise a communication network 100, a destination control system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the destination control system 200 according to one embodiment of the invention may communicate with the robot 300 to be described below via the communication network 100, and may function to: when information on obstruction of arrival at a first destination of the robot 300 is acquired, determine an obstruction area associated with the arrival obstruction information by clustering adjacent areas around the first destination; determine a destination candidate area around the obstruction area with reference to a size of the robot 300; and determine an area in the destination candidate area, which is specified on the basis of a location of the robot 300, as a second destination of the robot 300.

The adjacent areas, the obstruction area, and the destination candidate area according to one embodiment of the invention may be specified on the basis of at least one cell or pixel defined in a two-dimensional or three-dimensional map associated with the robot (e.g., a two-dimensional or three-dimensional map of a place where the robot is located). Here, when the map (specifically, map image) associated with the robot is partitioned and divided in the same size or different sizes (e.g., partitioned into a lattice or grid), the cell may refer to each of the divided unit figures (e.g., a circle, an ellipse, a triangle, a square, a rhombus, a sphere, a cube, or a rectangular parallelopipedon).

Meanwhile, although the destination control system 200 has been described as above, the above description is illustrative, and it will be apparent to those skilled in the art that at least a part of the functions or components required for the destination control system 200 may be implemented or included in the robot 300 to be described below or an external system (not shown), as necessary. Further, in some cases, all of the functions and components of the destination control system 200 may be implemented or included in the robot 300.

Next, the robot 300 according to one embodiment of the invention is a device that may communicate with the destination control system 200 via the communication network 100, and may autonomously perform predetermined functions or assigned tasks (e.g., serving food, retrieving containers, etc.) without any operation of a user. The robot 300 may include at least one of a module (e.g., a grab, a robotic arm module, etc.) for loading and unloading an object (e.g., a food tray), an imaging module (e.g., a visible light camera, an infrared camera, etc.) for acquiring images of surroundings, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for controlling a destination of the robot 300. The application may be downloaded from the destination control system 200 or an external application distribution server (not shown).

Configuration of the Destination Control System

Hereinafter, the internal configuration of the destination control system 200 crucial for implementing the invention and the functions of the respective components thereof will be discussed.

Figure 2:
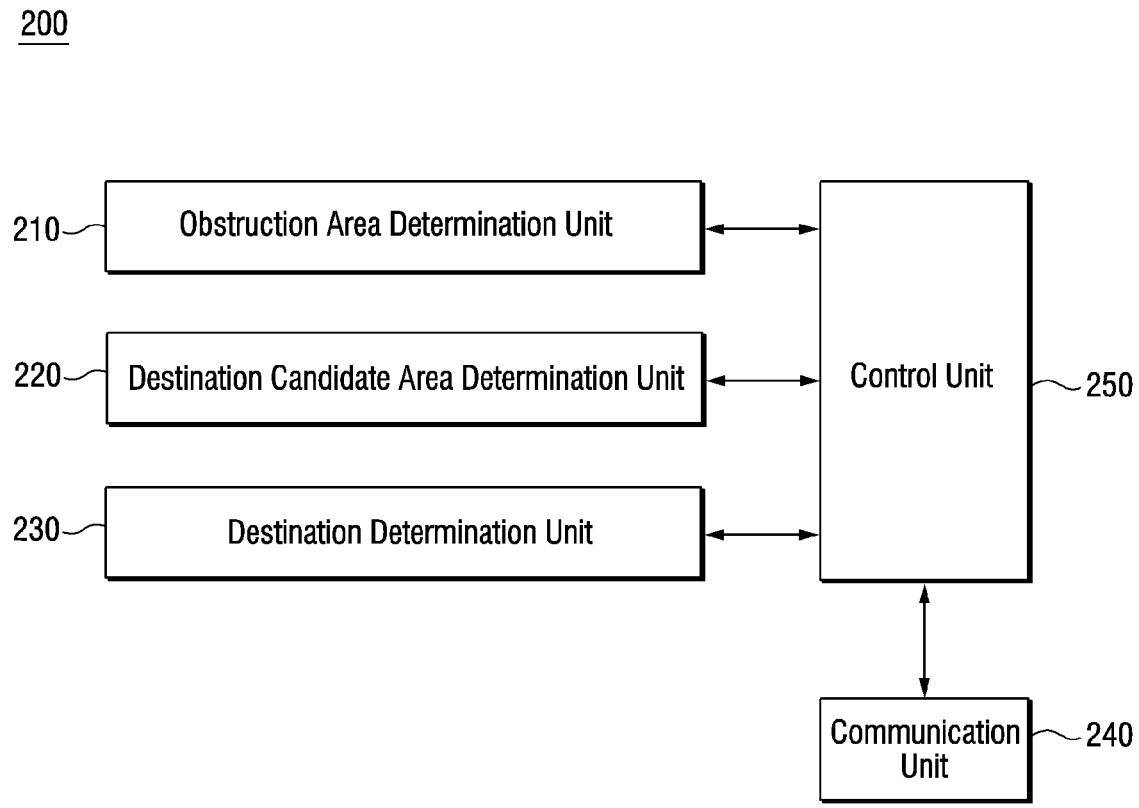
FIG. 2 illustratively shows the internal configuration of a destination control system according to one embodiment of the invention.

FIG. 2 illustratively shows the internal configuration of the destination control system 200 according to one embodiment of the invention.

As shown in FIG. 2, the destination control system 200 according to one embodiment of the invention may comprise an obstruction area determination unit 210, a destination candidate area determination unit 220, a destination determination unit 230, a communication unit 240, and a control unit 250. According to one embodiment of the invention, at least some of the obstruction area determination unit 210, the destination candidate area determination unit 220, the destination determination unit 230, the communication unit 240, and the control unit 250 may be program modules that communicate with an external system. The program modules may be included in the destination control system 200 in the form of operating systems, application program modules, and other program modules, while they may be physically stored in a variety of commonly known storage devices. Further, the program modules may also be stored in a remote storage device that may communicate with the destination control system 200. Meanwhile, such program modules may include, but are not limited to, routines, subroutines, programs, objects, components, and data structures for performing specific tasks or executing specific abstract data types according to the invention as will be described below.

First, the obstruction area determination unit 210 according to one embodiment of the invention may function to, when information on obstruction of arrival at a first destination of the robot 300 is acquired, determine an obstruction area associated with the arrival obstruction information by clustering adjacent areas around the first destination. According to one embodiment of the invention, the obstruction area determination unit 210 may acquire the arrival obstruction information on the basis of a sensor module (e.g., an image sensor, a radar sensor, a LIDAR sensor, etc.) included in or interworking with the robot 300, or acquire the arrival obstruction information from an external system. The arrival obstruction information according to one embodiment of the invention may include information indicating that the robot 300 is determined to be unable to arrive at the first destination. For example, the arrival obstruction information may indicate that the robot 300 is determined to be unable to approach or reach the first destination due to at least one obstacle dynamically disposed in the vicinity of the first destination.

For example, the obstruction area determination unit 210 may perform the above clustering by applying a flood-fill algorithm around the first destination in a map (e.g., a map image) associated with the robot to specify a closed area where at least one obstruction object associated with the arrival obstruction information exists, and may determine an obstruction area on the basis of the closed area. Here, in order to specify whether at least one obstruction object exists in the map associated with the robot, surroundings sensing information (e.g., information on whether an obstacle, a wall, or the like exists) acquired in real time or at predetermined intervals through the sensor module of the robot 300 or an external system (e.g., the aforementioned external system for acquiring the arrival obstruction information) may be utilized.

More specifically, the obstruction area determination unit 210 may successively cluster cells (or areas) determined to have an obstruction object associated with the arrival obstruction information, using a cell containing or adjacent to the first destination in the map associated with the robot as a starting point, to specify a closed area containing the clustered cells, and may determine an obstruction area on the basis of the closed area (e.g., an area equal to the closed area or expanded from the closed area by a predetermined level). Further, the above clustering may be successively performed for adjacent cells until empty cells (or free cells) are found at all boundaries. Here, the adjacent cells may refer to cells in direct contact or separated up to a predetermined level.

Next, the destination candidate area determination unit 220 according to one embodiment of the invention may function to determine a destination candidate area around the obstruction area with reference to a size of the robot 300.

For example, the destination candidate area determination unit 220 may specify an area having a size equal to that of the robot 300 or larger than that of the robot 300 by a predetermined level as a buffer area, and may determine an area expanded from the boundaries of the obstruction area by the buffer area as a destination candidate area.

Further, the destination candidate area determination unit 220 may differently determine the extent to which the buffer area is expanded from the boundaries of the obstruction area, with reference to at least one of the size and shape of the obstruction area.

For example, the destination candidate area determination unit 220 may determine the extent to which the buffer area is expanded to be smaller as the size of the obstruction area is smaller. The destination candidate area determination unit 220 may also determine the extent to which the buffer area is expanded to be larger as the size of the obstruction area is larger. Further, the destination candidate area determination unit 220 may determine the extent to which the buffer area is expanded to be larger as the shape of the obstruction area has more curvature variation. The destination candidate area determination unit 220 may also determine the extent to which the buffer area is expanded to be smaller as the shape of the obstruction area has less curvature variation. Meanwhile, the destination candidate area determination unit 220 may differently determine the extent to which the buffer area is expanded from each of the boundaries of the obstruction area.

Next, the destination determination unit 230 according to one embodiment of the invention may function to determine an area in the destination candidate area, which is specified on the basis of a location of the robot 300, as a second destination of the robot 300.

For example, the destination determination unit 230 may determine an area in the destination candidate area, which is specified as having the shortest distance to the location of the robot 300, as the second destination. The distance according to the invention may refer to a distance specified by a Euclidean distance, a Manhattan distance, a custom distance function, or the like, and the shortest distance as above may be calculated using a breadth-first search (BFS) algorithm with respect to the location of the robot 300.

As another example, the destination determination unit 230 may determine an area in the destination candidate area, which intersects a virtual straight line connecting the location of the robot 300 and the first destination, as the second destination.

Next, according to one embodiment of the invention, the communication unit 240 may function to enable data transmission/reception from/to obstruction area determination unit 210, the destination candidate area determination unit 220, and the destination determination unit 230.

Lastly, according to one embodiment of the invention, the control unit 250 may function to control data flow among the obstruction area determination unit 210, the destination candidate area determination unit 220, the destination determination unit 230, and the communication unit 240. That is, the control unit 250 according to one embodiment of the invention may control data flow into/out of the destination control system 200 or data flow among the respective components of the destination control system 200, such that the obstruction area determination unit 210, the destination candidate area determination unit 220, the destination determination unit 230, and the communication unit 240 may carry out their particular functions, respectively.

FIGS. 3A to 6 illustratively show a process of controlling a destination of the robot 300 according to one embodiment of the invention.

Figure 3A:
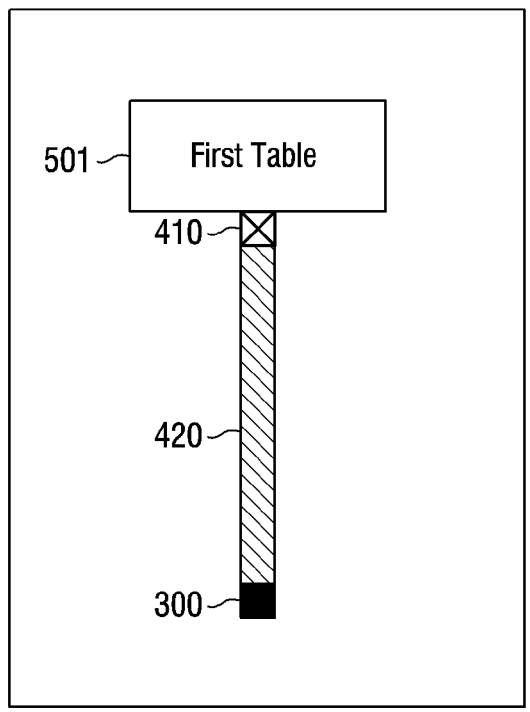
FIG. 3A illustratively shows a process of controlling a destination of a robot according to one embodiment of the invention.
Figure 3B:
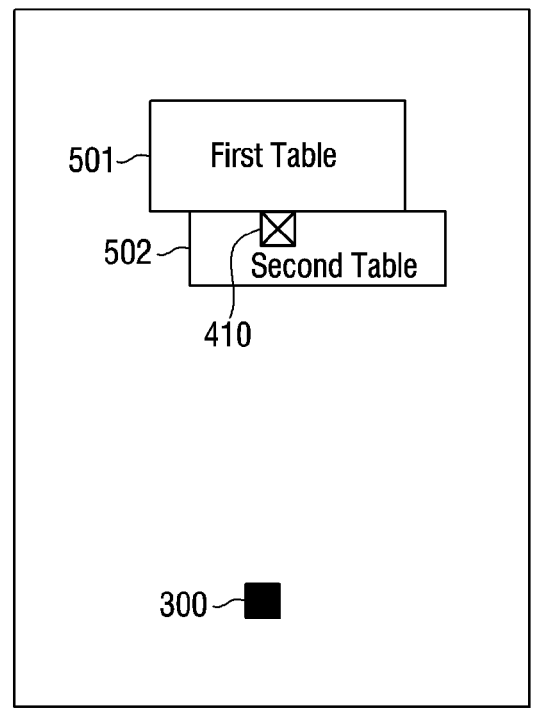
FIG. 3B illustratively shows a process of controlling a destination of a robot according to one embodiment of the invention.

Referring to FIGS. 3A and 3B, when a first destination 410 of the robot 300 is set at one side of a first table 501, the robot 300 may move from its current location to the first destination 410 along a straight route 420 (see FIG. 3A). However, a situation in which it is difficult for the robot 300 to reach the first destination 410 due to a second table 502 (e.g., due to the relocation of the second table 502) may occur (see FIG. 3B), in which case an alternative destination may be set through the destination control system 200 according to the present invention.

Figure 4:
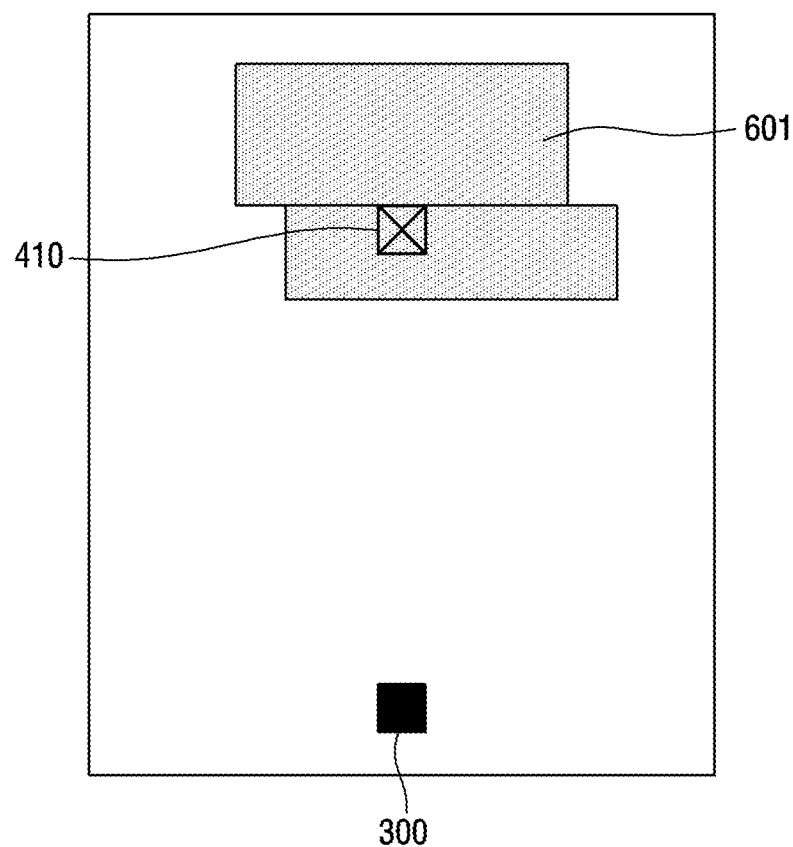
FIG. 4 illustratively shows a process of controlling a destination of a robot according to one embodiment of the invention.

First, referring to FIG. 4, according to one embodiment of the invention, when information on obstruction of arrival at the first destination 410 of the robot 300 is acquired, an obstruction area 601 associated with the arrival obstruction information may be determined by clustering adjacent areas around the first destination 410.

For example, areas determined to have obstruction objects associated with the arrival obstruction information (i.e., the first table 501 and the second table 502) around the first destination 410 may be successively clustered to specify a closed area containing the clustered areas, and the obstruction area 601 may be determined on the basis of the closed area.

Figure 5:
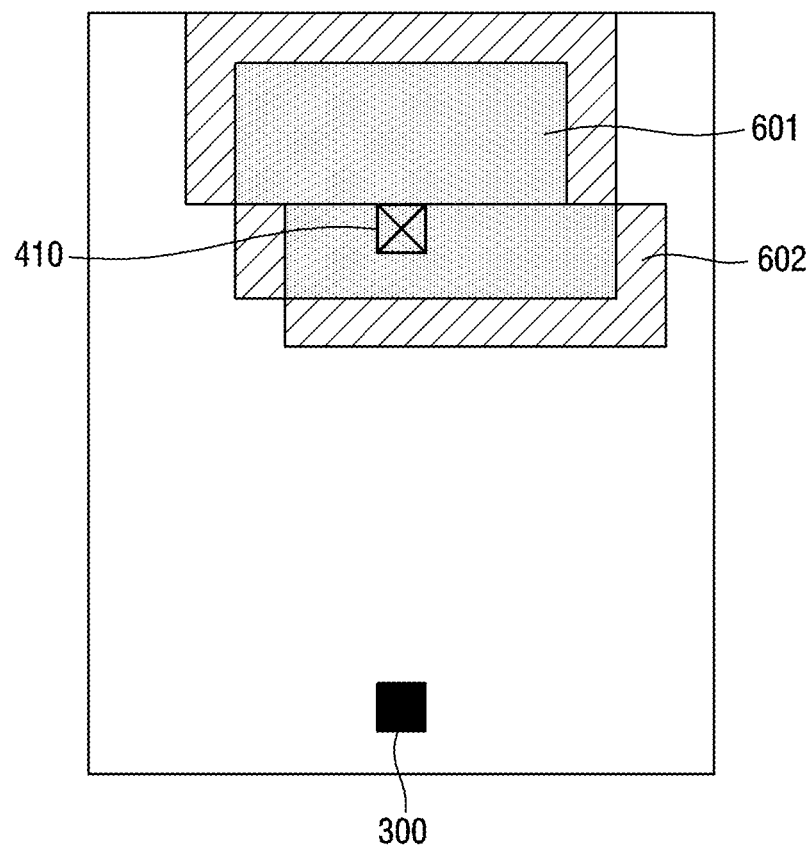
FIG. 5 illustratively shows a process of controlling a destination of a robot according to one embodiment of the invention.

Next, referring to FIG. 5, according to one embodiment of the invention, a destination candidate area 602 around the obstruction area 601 may be determined with reference to a size of the robot 300.

For example, an area having a size equal to that of the robot 300 or larger than that of the robot 300 by a predetermined level may be specified as a buffer area, and an area expanded from the boundaries of the obstruction area 601 by the buffer area may be determined as the destination candidate area 602.

Figure 6:
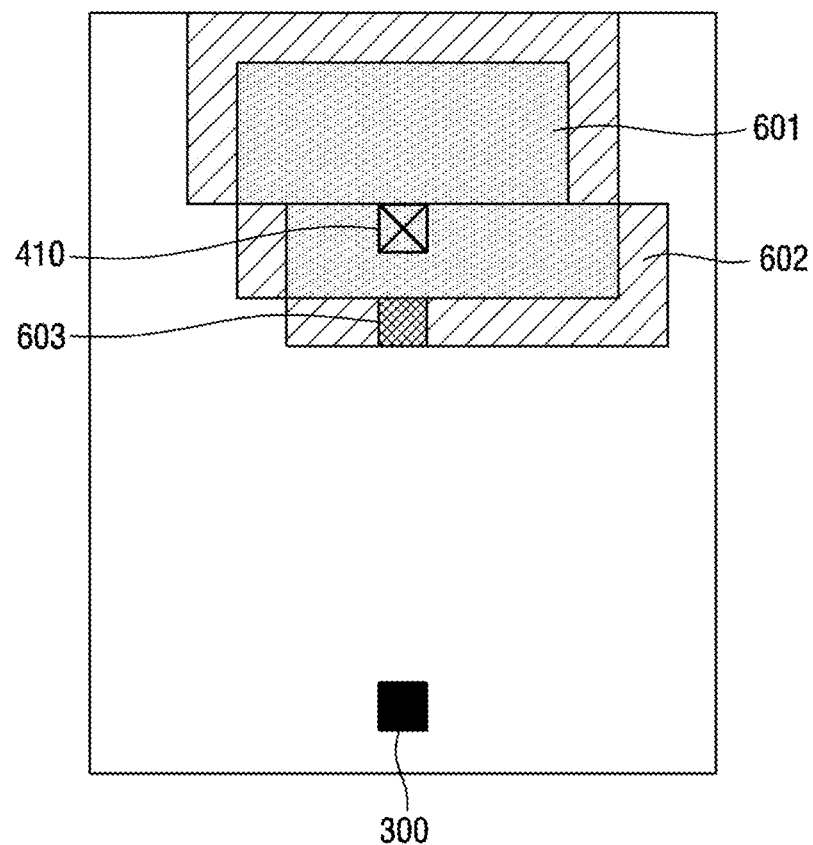
FIG. 6 illustratively shows a process of controlling a destination of a robot according to one embodiment of the invention.

Next, referring to FIG. 6, according to one embodiment of the invention, an area in the destination candidate area 602, which is specified on the basis of a location of the robot 300, may be determined as a second destination 603 of the robot 300.

For example, an area in the destination candidate area 602, which is specified as having the shortest distance to the location of the robot 300, may be determined as the second destination 603.

Next, according to one embodiment of the invention, the robot 300 may move to the second destination 603, which is an alternative to the first destination 401. Meanwhile, when information on obstruction of arrival at the second destination 603 is acquired while the robot 300 moves to the second destination 603, a third destination of the robot 300 may be determined by repeating the above process and then the robot 300 may move to the third destination.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 7:
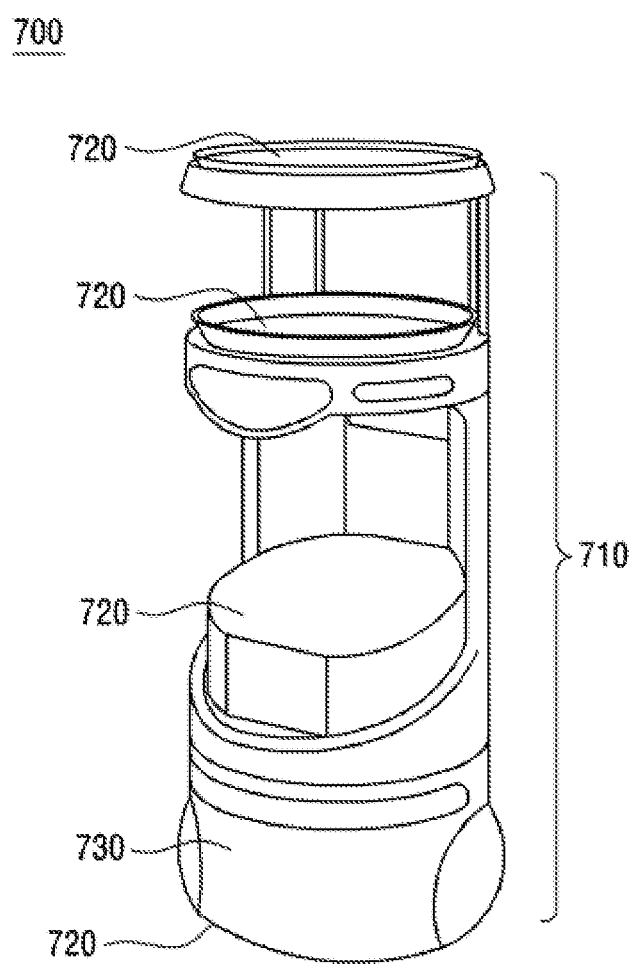
FIG. 7 illustratively shows the structure of a robot according to one embodiment of the invention.

Referring to FIG. 7, the robot 300 may comprise a main body 710, a drive unit 720, and a processor 730.

For example, the main body 710 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 8:
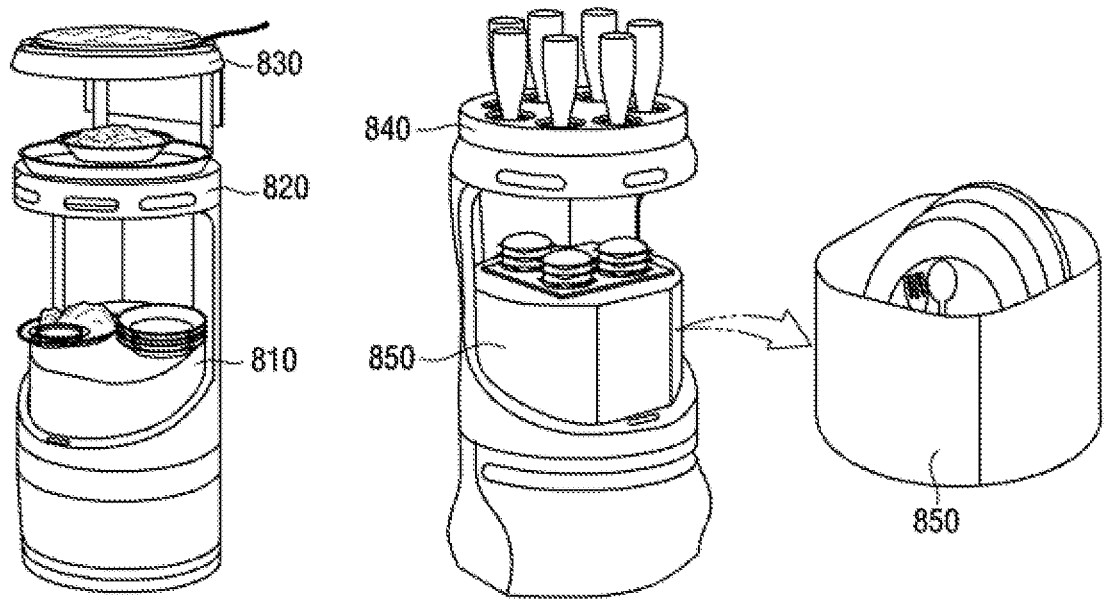
FIG. 8 illustratively shows the structure of a robot according to one embodiment of the invention.

Referring to FIG. 8, when the robot 300 is a serving robot, it may include a first space 810 and a second space 820 for providing the transported object and collecting the retrieved object. Further, the robot 300 may further include a third space 830 that is an expansion space provided via a removable pillar, and more loading spaces may be provided by adding more expansion spaces as needed. Further, the robot 300 may further include a tray 840 dedicated for the transported or retrieved object. For example, the tray 840 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 810 of the robot 300 may include a fourth space 850 that may be taken out through a lateral side of the robot 300. The fourth space 850 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 7, the main body 710 may further include an imaging module (e.g., a visible light camera, an infrared camera, etc.) (not shown) and a scanner module (e.g., a LIDAR sensor) for acquiring images of surroundings and information on obstacles.

Next, the drive unit 720 according to one embodiment of the invention may comprise a module for moving the main body 710 to other locations or a module for loading and unloading the transported and retrieved objects.

For example, the drive unit 720 may include a module related to electrically, mechanically, or hydraulically driven wheels, propellers, or the like as the module for moving the main body 710 to other locations, and may include a robotic arm module for mounting and conveying the transported and retrieved objects as the module for loading and unloading the transported and retrieved objects.

Next, the processor 730 according to one embodiment of the invention may be electrically connected to the drive unit 720 to perform a function of controlling the drive unit 720 (and may include a communication module for communicating with an external system). For example, the processor 730 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 730 may perform the functions of at least one of the obstruction area determination unit 210, the destination candidate area determination unit 220, and the destination determination unit 230 of the destination control system 200 according to the invention (e.g., the corresponding functions may be modularized and included in the processor 730), and may function to control the drive unit 720 through communication with an external system (not shown) that performs the functions of at least one of the obstruction area determination unit 210, the destination candidate area determination unit 220, and the destination determination unit 230.

Specifically, the processor 730 may function to: when information on obstruction of arrival at a first destination of the robot 300 is acquired, determine an obstruction area associated with the arrival obstruction information by clustering adjacent areas around the first destination; determine a destination candidate area around the obstruction area with reference to a size of the robot 300; and determine an area in the destination candidate area, which is specified on the basis of a location of the robot 300, as a second destination of the robot 300.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for dynamically setting an alternative destination of a robot, the method comprising the steps of:
    acquiring information on obstruction of arrival at a first destination of a robot, and determining an obstruction area associated with the arrival obstruction information by clustering adjacent areas around the first destination;
    determining a destination candidate area around the obstruction area with reference to a size of the robot;
    determining an area in the destination candidate area, which is specified on the basis of a location of the robot, as a second destination of the robot; and
    controlling the robot to autonomously drive to the second destination,
    wherein in the step of determining the obstruction area, a closed area is specified by successively clustering an area adjacent to the closed area where at least one obstruction object associated with the arrival obstruction information exists, using an area containing or adjacent to the first destination in a map associated with the robot as a starting point of the closed area, and the obstruction area is determined on the basis of the specified closed area, and
    wherein in the step of determining the obstruction area, the clustering is successively performed until areas where the at least one obstruction object does not exist are found at all boundaries of the closed area.

2. The method of claim 1, wherein the arrival obstruction information indicates that the robot is determined to be unable to arrive at the first destination.

3. The method of claim 1, wherein the adjacent areas, the obstruction area, and the destination candidate area are specified on the basis of at least one cell defined in a two-dimensional or three-dimensional map associated with the robot.

4. The method of claim 1, wherein in the step of determining the second destination, an area in the destination candidate area, which is specified as having the shortest distance to the location of the robot, is determined as the second destination.

5. The method of claim 1, wherein in the step of determining the second destination, an area in the destination candidate area, which intersects a virtual straight line connecting the location of the robot and the first destination, is determined as the second destination.

6. A non-transitory computer-readable recording medium having stored thereon a computer program for executing the method of claim 1.

7. The method of claim 1, wherein the adjacent areas around the first destination are clustered by applying a flood-fill algorithm in the map.

8. A system for dynamically setting an alternative destination of a robot, the system comprising:
    an obstruction area determination unit configured to acquire information on obstruction of arrival at a first destination of a robot, and to determine an obstruction area associated with the arrival obstruction information by clustering adjacent areas around the first destination;
    a destination candidate area determination unit configured to determine a destination candidate area around the obstruction area with reference to a size of the robot;
    a destination determination unit configured to determine an area in the destination candidate area, which is specified on the basis of a location of the robot, as a second destination of the robot; and
    a drive unit configured to control the robot to autonomously drive to the second destination,
    wherein the obstruction area determination unit is configured to specify a closed area by successively clustering an area adjacent to the closed area where at least one obstruction object associated with the arrival obstruction information exists, using an area containing or adjacent to the first destination in a map associated with the robot as a starting point of the closed area, and to determine the obstruction area on the basis of the specified closed area, and
    wherein the obstruction area determination unit is configured to successively perform the clustering until areas where the at least one obstruction object does not exist are found at all boundaries of the closed area.

9. The system of claim 8, wherein the arrival obstruction information indicates that the robot is determined to be unable to arrive at the first destination.

10. The system of claim 8, wherein the adjacent areas, the obstruction area, and the destination candidate area are specified on the basis of at least one cell defined in a two-dimensional or three-dimensional map associated with the robot.

11. The system of claim 8, wherein the destination determination unit is configured to determine an area in the destination candidate area, which is specified as having the shortest distance to the location of the robot, as the second destination.

12. The system of claim 8, wherein the destination determination unit is configured to determine an area in the destination candidate area, which intersects a virtual straight line connecting the location of the robot and the first destination, as the second destination.

13. The system of claim 8, wherein the adjacent areas around the first destination are clustered by applying a flood-fill algorithm in the map.

\* \* \* \* \*